Figure 1:
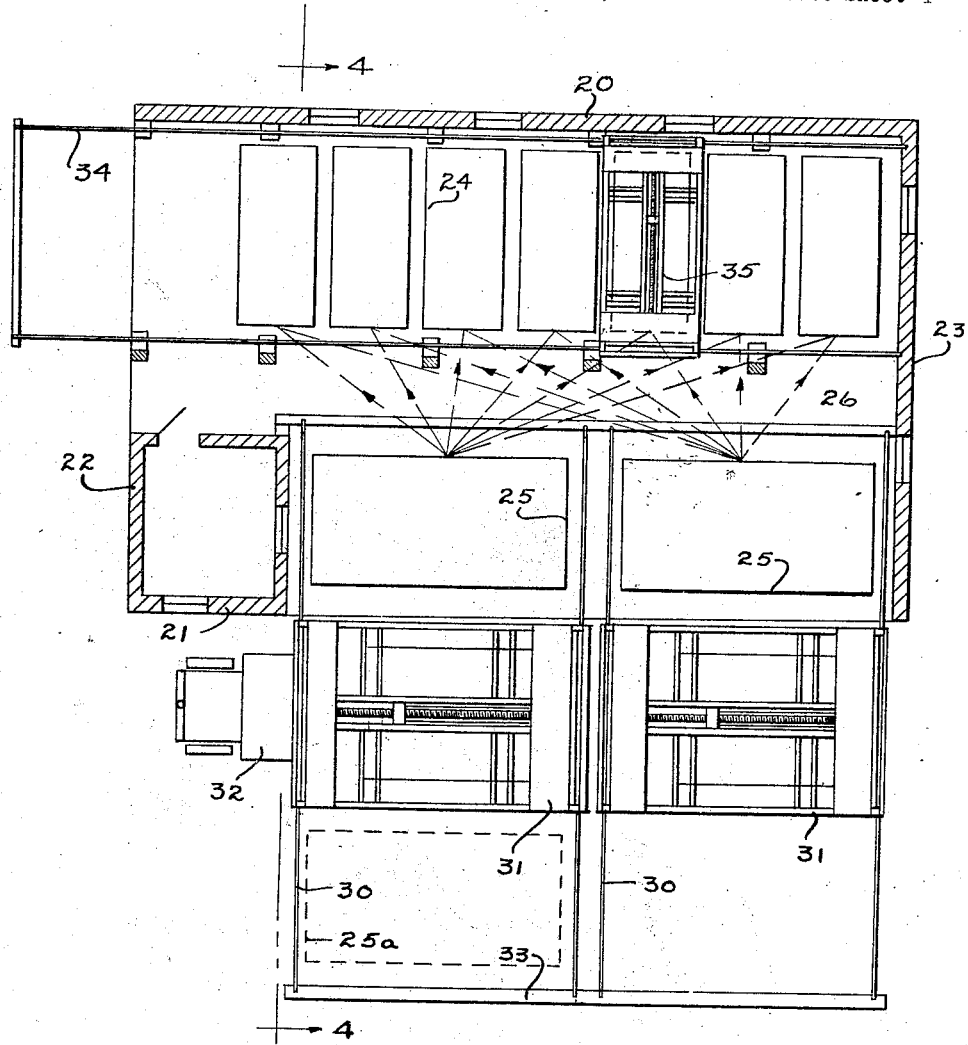

March 16, 1926.

B. F. FITCH 1,577,185

FREIGHT TRANSFERRING SYSTEM

Filed Sept. 30, 1925    5 Sheets-Sheet 1

FIG.— 1

Inventor

Benjamin F. Fitch,

By Baker, Macklin, Golrick & Hear
Attorneys

March 16, 1926. 1,577,185
B. F. FITCH
FREIGHT TRANSFERRING SYSTEM
Filed Sept. 30, 1925 5 Sheets-Sheet 2

FIG.—2

Inventor
Benjamin F. Fitch
By Baker, Macklin, Gobrick & Pearl
Attorneys

March 16, 1926.

B. F. FITCH 1,577,185

FREIGHT TRANSFERRING SYSTEM

Filed Sept. 30, 1925     5 Sheets-Sheet 3

FIG.—3

March 16, 1926.

B. F. FITCH 1,577,185

FREIGHT TRANSFERRING SYSTEM

Filed Sept. 30, 1925    5 Sheets-Sheet 4

March 16, 1926. 1,577,185
B. F. FITCH
FREIGHT TRANSFERRING SYSTEM
Filed Sept. 30, 1925    5 Sheets-Sheet 5

Patented Mar. 16, 1926.

1,577,185

UNITED STATES PATENT OFFICE.

BENJAMIN F. FITCH, OF GREENWICH, CONNECTICUT.

FREIGHT-TRANSFERRING SYSTEM.

Application filed September 30, 1925. Serial No. 59,450.

*To all whom it may concern:*

Be it known that I, BENJAMIN F. FITCH, a citizen of the United States, residing at Greenwich, in the county of Fairfield and State of Connecticut, have invented a certain new and useful Improvement in a Freight-Transferring System, of which the following is a full, clear, and exact description, reference being had to the accompanying drawings.

The handling of freight on containers comprising removable automobile bodies and the establishment of inland terminals is set forth in Patent No. 1,275,145 issued to me August 6th, 1918. The apparatus set forth in this patent includes briefly, a container which occupies substantially the entire load carrying space on the chassis frame of a motor vehicle and comprises what may commonly be termed a "heavy duty truck." In the expansion of such a system to the distribution of freight from the point of origin to the consignee, especially for route delivery, if a heavy duty truck were to be used, then the long vehicle hauls while empty would be a detriment to the efficiency of the truck, and in addition, the space required at the station for storing the containers during a loading operation would also be detrimental to the operating efficiency of the terminal station.

To eliminate the objection of employing a heavy duty truck from the point of origin to the local consignee, mercantile concerns have established stations remote from the point of origin and from each other and have employed heavy duty trucks for conveying freight from the point of origin to the sub-station, with horse-drawn vehicles or relatively light trucks for traversing the delivery routes which lead from the sub-station. In practice, the freight must be carefully checked at the point of origin to insure delivery to the proper sub-station truck and then at the sub-station all of the freight is unloaded while the truck remains idle. This freight is usually transported into different bins or floor spaces in accordance with its delivery wagon to which it may be assigned. Such distribution, besides the time for checking and rechecking requires considerable time to assemble the freight in proper position within the delivery wagon or truck from the individual spaces or bins. Such sorting necessitates idle time by the delivery vehicle which otherwise might be traveling over the delivery route.

To increase the size of the sub-station for handling an increased volume of business entails considerable expense, particularly where the sub-stations are situated in built-up localities. Moreover, to increase the number of route delivery vehicles necessitates additional street area for parking purposes during the loading and unloading operation, unless sufficient area is obtained to permit adequate space for parking and driving within the sub-station property limit.

One of the principal objects of the present invention is the provision of a freight handling system, including the apparatus for carrying out such system, to permit the handling of a greatly increased volume of freight particularly where sub-stations are utilized for handling the freight beyond what is commonly considered to be the saturation point.

Moreover, my invention is directed towards the provision of a system which may be used by a large mercantile establishment, or which may be used by a number of commercial concerns, all of which are more or less centrally located within a city and which deliver their merchandise over substantially the same delivery route.

A further object of my invention is to provide apparatus which may be used in connection with my system and to so arrange the apparatus that the freight may be handled with minimum space requirement for the sub-station.

In this connection, I propose to provide apparatus which permits the volume of business to be greatly increased without necessitating considerable expenditure for additional equipment as well as realty holdings and without necessitating confiscation of street area during the loading and unloading from the sub-station. Moreover, the apparatus is designed to permit the loading and unloading to be accomplished without necessitating the transporting vehicle to remain idle during such operation.

Figure 2:
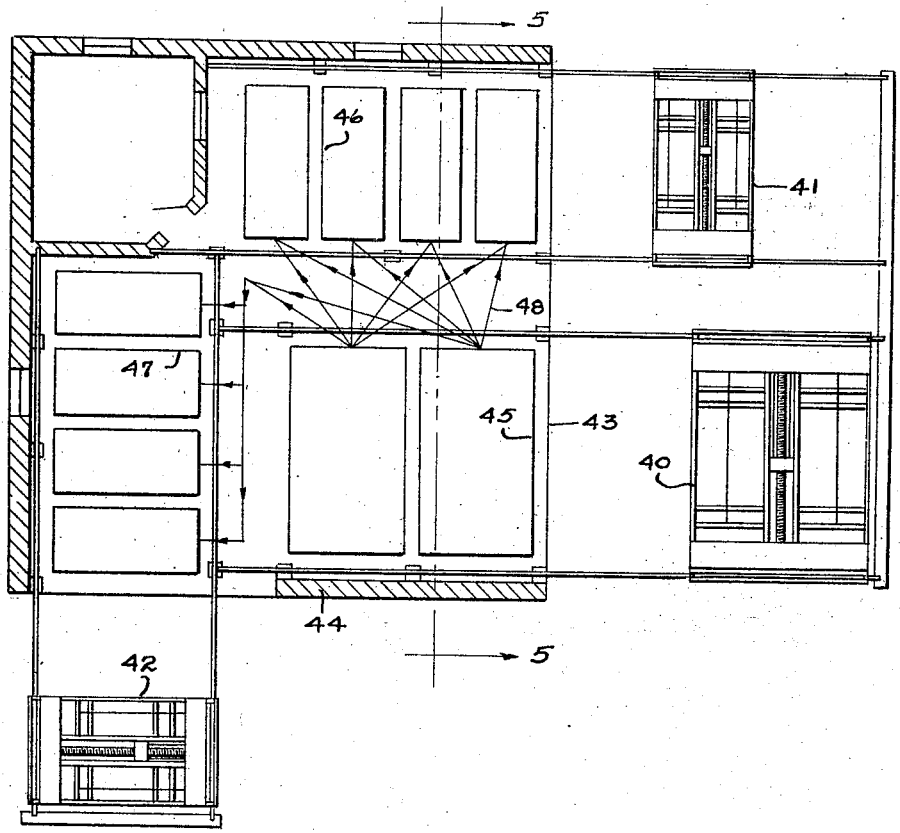
Figure 3:
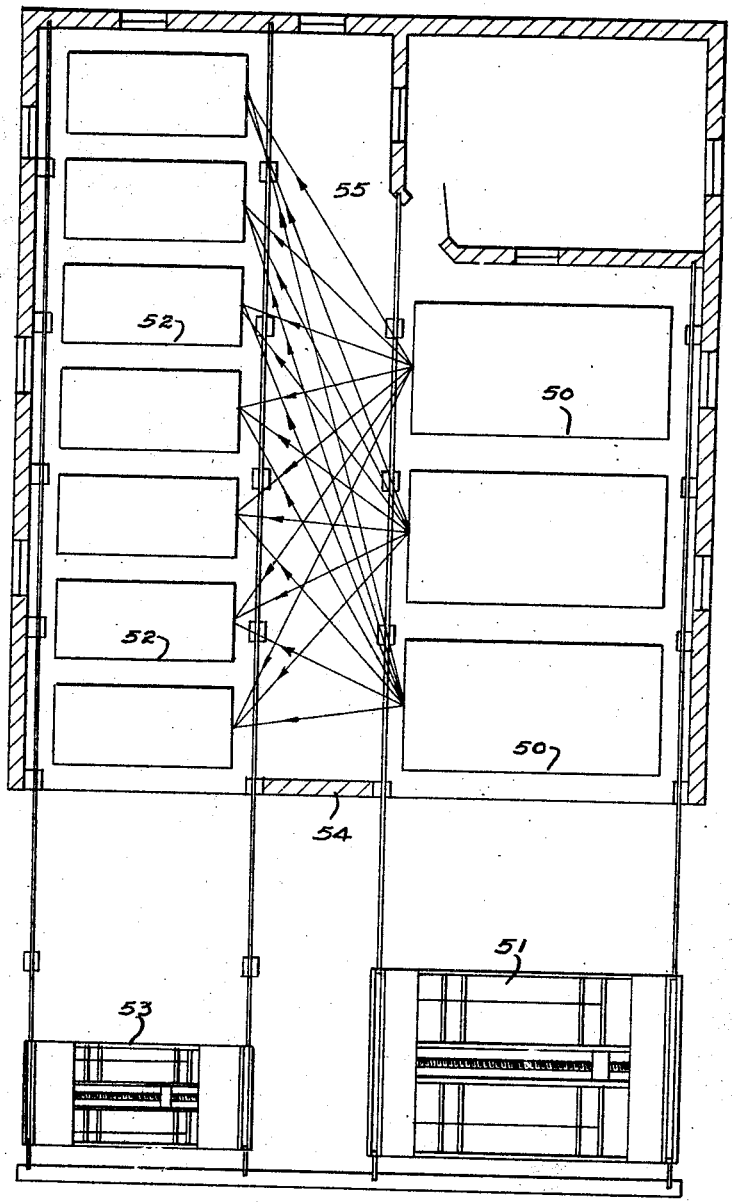
Figure 4:
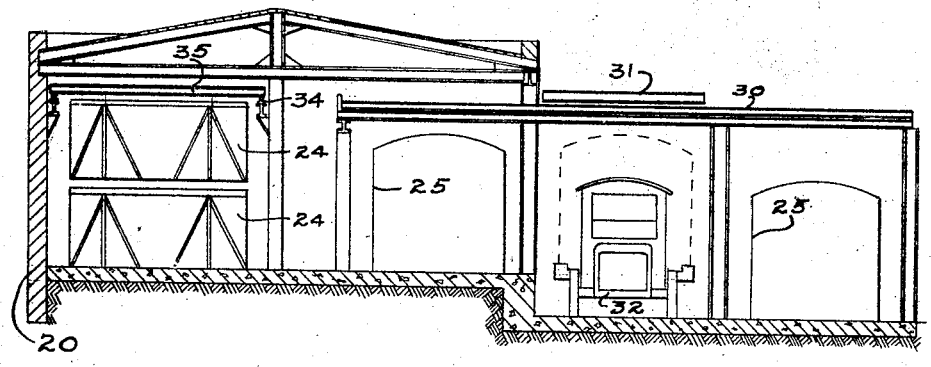
Figure 5:
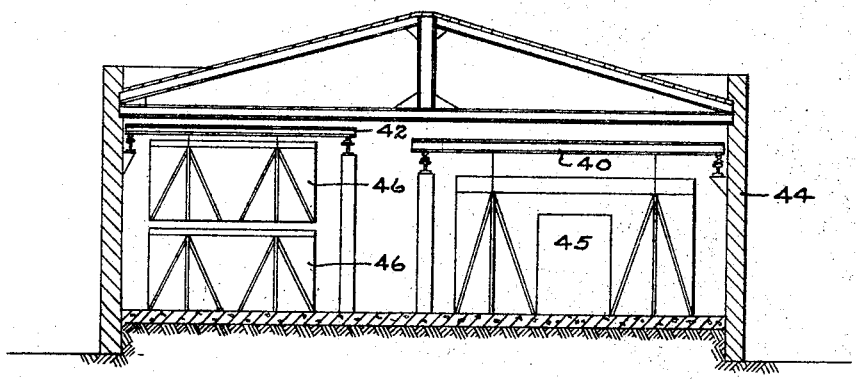

The aparatus for carrying out my system is shown in the drawings wherein Fig. 1 is a plan view partly in section of a sub-station which is equipped to handle freight in accordance with my system; Fig. 2 is a plan view partly in section of another arrangement for carrying out the same result in Fig. 1; Fig. 3 is still another plan view partly in section showing an arrangement of apparatus different from that shown in Figs. 1 and 2; Fig. 4 is a section taken on a plane indicated by the line 4—4 in Fig. 1; Fig. 5 is a section taken on a plane indicated by the line 5—5 in Fig. 2 while Fig. 6 is a view showing diagrammatically an arrangement of sub-stations with deliveries between the point of origin and the sub-stations, and with delivery routes leading from the sub-station.

Figure 6:
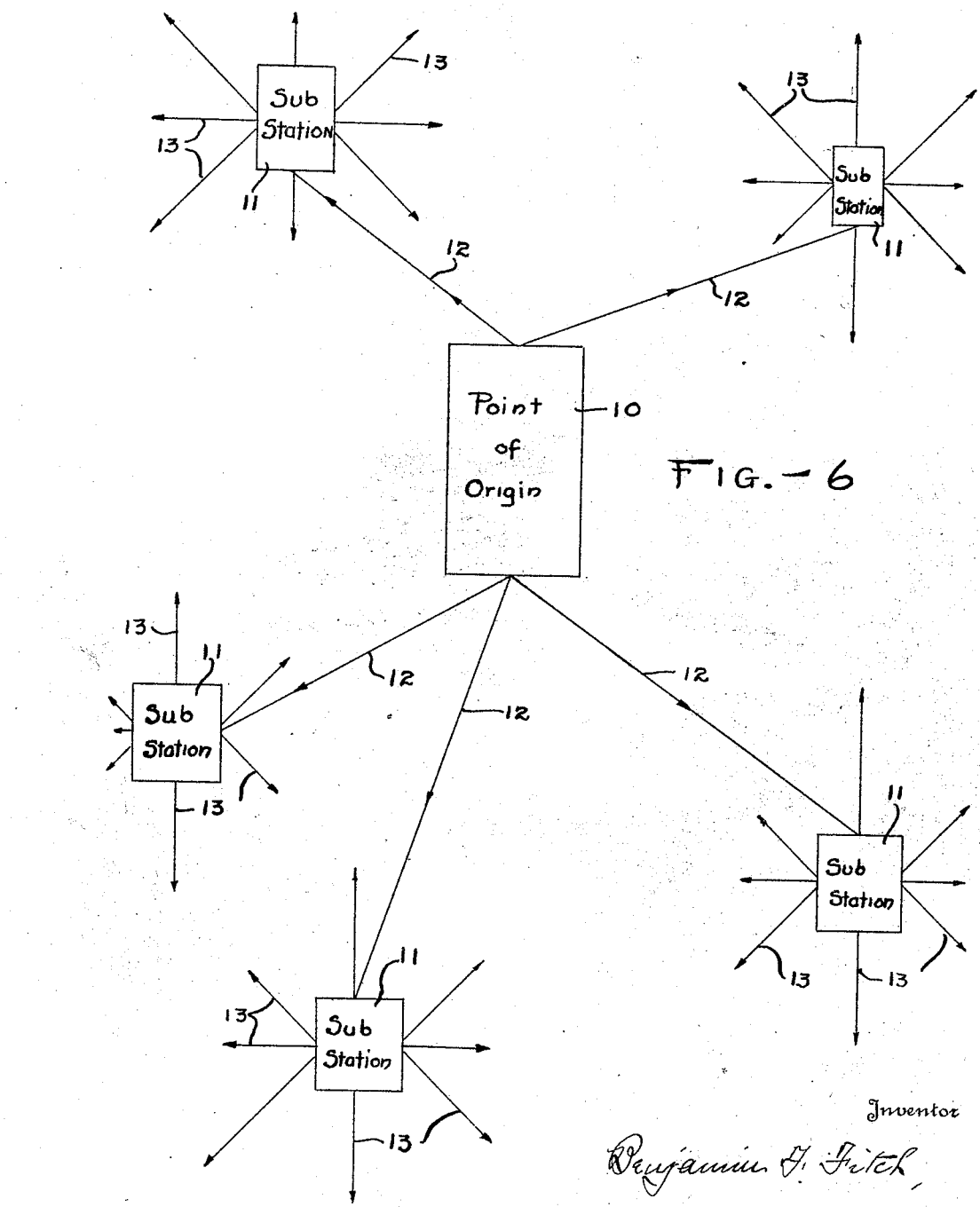

Referring first to Fig. 6, I have shown an outline which illustrates the manner in which my system may be carried out. For example, the point of origin is indicated at 10 while sub-stations are indicated at 11. Assuming that the point of origin is located in the central portion of a city, then the sub-stations would be located in the out-lying district and as nearly as possible in the central portion of the district which is served from the particular sub-station. The point of origin indicated at 10 may be a mercantile concern or it may be an inland terminal station such as is set forth in Patent No. 1,275,145 issued to me August 6th, 1918.

In carrying out my system, I employ removable automobile bodies with suitable apparatus at the point of origin and at the sub-stations for transporting a body to and from a motor truck. Between the point of origin and each sub-station, I have shown routes 12 over which heavy duty trucks may travel. These heavy duty trucks have relatively large size removable bodies which are loaded at the point of origin and are unloaded at the sub-station.

The apparatus required at the point of origin for transferring removable automobile bodies to and from a motor vehicle may comprise suitable overhead hoisting and transporting mechanism. The apparatus at the sub-station, however, must be arranged to provide sufficient space for effecting the distribution of freight and for enabling the transfer between truck and platform to be readily accomplished.

One arrangement of a sub-station is indicated in Fig. 1 wherein the station is illustrated as having side walls 20 and 21 and end walls 22 and 23 respectively. A platform space along the wall 20 is provided for small sized removable automobile bodies 24 while another space is provided along the wall 21 for large sized removable automobile bodies 25. Between the row of bodies 24 and 25 a trucking space 26 is provided across which freight may be transported for distribution from the bodies 25 to the bodies 24.

The large sized bodies are brought to the point of origin by motor vehicles which arrive at the sub-station in a vehicle runway along the side 21 and beneath one of the crane runways indicated at 30. An overhead hoisting crane 31 is adapted to travel laterally with reference to the building so as to raise a body from a motor vehicle, transport it and then deposit it on the station platform.

The crane runway is sufficiently wide to provide sufficient space for enabling a crane to effect an interchange between the loaded and empty bodies. For example, if a truck 32 having a loaded body thereon arrives at the station, then before the vehicle is drawn beneath one of the cranes 31, then the empty body on the platform is raised and transported laterally over the vehicle runway and deposited in the space 33 as shown by the broken lines 25$^a$, then if the truck is driven beneath the runway alongside the body 25$^a$, the crane may raise the loaded body from the truck, transport it laterally and transport it upon the platform. After the loaded body is released, the crane may return to pick up the empty body 25$^a$ and deposit it upon the vehicle.

To permit handling of the small sized body, I have shown a vehicle runway along the outer side of the station adjacent the wall 22, and I have shown a crane runway 34 which extends over the row of small sized bodies and also overhangs the vehicle runway. A crane 35 is adapted to travel overhead and is sufficiently high above the platform to permit one body to be transported over other small sized bodies on the platform. If desired, I may employ a smaller number of small sized bodies than the space will accommodate so as to have an extra space into which a loaded body may be immediately deposited on a vehicle arriving at the station.

With the arrangement shown in Fig. 1, if the large sized bodies have doors at the sides thereof and the small sized bodies have doors at the ends thereof, then freight may be delivered manually from either of the large to any of the small bodies, as indicated by the directional lines leading from the large to the small bodies. During the loading operation, each small sized body may preferably have a delivery boy who is responsible for all merchandise which is delivered into his particular container. The delivery boy will place the packages in the container in the proper order to permit convenient removal when the container is passing over the delivery route. While one delivery boy is loading one container, there will be another delivery boy with the container passing around the delivery route. Thus the boy who provides the loading is responsible for every article which passes to his container. This leaves the chauffeur free to devote his entire time to operating the motor vehicle. In this way, the motor vehicle will cover much greater territory, while the work required to maintain an accurate checking is reduced to a minimum.

The freight arrangement shown in Fig. 1 embodies a substantially rectangular building with two large cranes and one small crane. Where the conditions require, one large crane and two small cranes may be utilized. Such an arrangement is shown in Fig. 2 wherein a large sized crane is designated at 40 while the small sized cranes are indicated at 41 and 42 respectively. In this arrangement, a vehicle runway extends along one side 43 of the station while another vehicle runway extends along the side 44 of the station. The large containers 45 are shown on the platform beneath the runway of the crane 40, while small containers 46 and 47 are shown beneath the runways of the cranes 41 and 42 respectively. The arrows indicate the direction of freight from the large containers to the small containers through door openings in the ends of the large and small containers.

In Fig. 3, I have shown another arrangement wherein large containers 50 are deposited in a row on a station platform beneath the runway of a large sized crane 51, while another row of small sized bodies 52 are deposited in a row beneath a small sized crane 53. In this arrangement, only one vehicle driveway may be provided adjacent one side 54 of the station. The arrows 55 show the path of transportation between the containers 50 and 52.

Referring now to Fig. 4, I have provided a depressed vehicle runway adjacent the side 21 of the building shown in Fig. 1. Moreover, the cranes 30 which I adapt to travel over the vehicle runways are required to lift a body only a short distance sufficient to permit a clearance over the corner brackets on the truck. This enables a sub-station to be built at small cost since it lowers the necessary building height and obviates the necessity for expensive crane equipment. On the other hand, the crane 35 also shown in Fig. 4 may raise a small body over other small bodies positioned on the platform, but the overall distance between the platform and small crane need not be much greater than that required for the large sized crane.

The loading at the point of origin and unloading at the sub-station may be accomplished without requiring the truck to remain idle. Thus one truck may move from the point of origin with a loaded large body to a sub-station where the loaded body is exchanged for an empty one and may then return to the point of origin, where the empty body is replaced by another loaded body which may be directed to the same or to a different sub-station.

At the sub-station, provision is made for enabling freight to be transferred from the loaded large body into empty small-sized bodies and further provision is made for transporting the small sized bodies to route delivery vehicles. The delivery routes lead from the sub-station as indicated by arrows 13 and are arranged to cover the entire zone for which the particular sub-station comprises a distributing medium. By employing removable automobile bodies on the delivery vehicles, one truck may be in transit while another body is being loaded at the sub-station. Thus when the vehicle returns from the route, the empty body may be quickly replaced by a loaded body, and the vehicle may start out on another delivery route, or may start out on another trip over the same delivery route.

An important advantage of a freight handling system embodying my invention is the fact that a greatly increased volume of freight may be handled in a given time over that which could be handled under present circumstances. Moreover, the increased volume may be handled without necessitating the expenditure of considerable sums of money for acquiring realty holdings in built-up locations. By using sub-stations, one large sized container is employed for conveying freight from the point of origin to the substation and small sized containers may be employed for conveying freight from the sub-station over the delivery route. By the use of apparatus for lifting the bodies from motor vehicles, the loading and unloading operation may be accomplished without requiring the trucks to remain idle. In this way, a small number of trucks may suffice to handle a large volume of freight within a short period of time. By providing bodies and trucks and by employing two delivery boys for each delivery route, then one boy may be loading a container at the sub-station, while the other is traveling with a truck over the delivery route. This reduces to a minimum the time required for checking and rechecking and places the responsibility on a small number of persons.

Having thus described my invention, I claim:—

1. A system of handling freight by means of a plurality of sub-stations which are spaced from a point of origin and from each other, comprising bringing freight in removable automobile bodies from the point of origin to the sub-stations, raising and transporting the bodies from automobiles at the sub-station, and depositing them, collocating the freight from such loaded bodies to empty bodies, raising the latter bodies, transporting them and depositing them on other vehicles, and then sending the last mentioned vehicles over delivery routes.

2. A system of handling freight by means of a plurality of sub-stations located at various points adjacent city streets comprising bringing freight over city streets in removable automobile bodies from a common point of origin to the various sub-stations, raising and transporting the bodies from automobiles, depositing them at the sub-station platform and collocating the freight from such loaded bodies into empty bodies positioned at the platform, raising the latter bodies, transporting them and depositing them to other vehicles, and then sending the last mentioned vehicles over city streets.

3. A system of handling freight by means of a plurality of sub-stations which are spaced from each other, comprising bringing freight in relatively large-sized removable automobile bodies from the point of origin to the stations, providing relatively small removable automobile bodies at each station, transporting the large sized bodies into position adjacent the small sized bodies, removing the freight from the large bodies and placing it in the small bodies, sending the empty large bodies back to the point of origin, and sending the filled small bodies over predetermined delivery routes.

4. A system of handling freight by means of sub-stations at points remote from a point of origin and from each other, comprising bringing freight from the point of origin in relatively large removable automobile bodies, raising the bodies at the sub-stations, transporting them and depositing them in a row on the station platform, arranging relatively small automobile bodies in another row on the paltform in such manner that a trucking space is provided between the rows, removing the freight from the large bodies, hand sorting it and delivering it to the small bodies, sending the empty large bodies back to the point of origin and sending the filled small bodies over delivery routes.

5. In combination, a freight station, relatively large removable automobile bodies and relatively small automobile bodies at the station, cranes for raising and transporting the bodies between the station and a vehicle, there being one crane having a relatively short lift, and another crane having a relatively large lift, the short lift crane being arranged for handling the large bodies, and the large lift crane being arranged to handle the small bodies.

6. In combination, a freight station having a depressed runway along one side thereof, relatively large removable automobile bodies at the station, a crane trackway extending over said bodies and overhanging the runway, said crane being positioned above the runway sufficient only for permitting a body to clear the truck and for depositing the body within the station, a plurality of relatively small automobile bodies, a crane extending over said bodies, and also projecting beyond the station, said last mentioned crane having a lift sufficient to permit one small body to be raised and transported over other small bodies.

7. In combination, a freight station, relatively large and relatively small removable automobile bodies at the station, overhead traveling cranes for raising and transporting said bodies, there being a plurality of cranes of one size for handling one size of removable automobile bodies, and there being a single crane for handling another size of removable automobile bodies.

8. In combination, a station having a platform associated therewith and having vehicle runways along two sides thereof at right angles to each other, overhead traveling cranes adapted to extend over part of the platform and overhanging the runways, such cranes being adapted to arrange removable automobile bodies in rows on the platform so as to leave a trucking space between the rows of bodies.

In testimony whereof, I hereunto affix my signature.

BENJAMIN F. FITCH.